June 27, 1939.  G. R. ANDERSON  2,163,972
CONTROL SYSTEM FOR DYNAMO-ELECTRIC MACHINES
Filed March 2, 1936
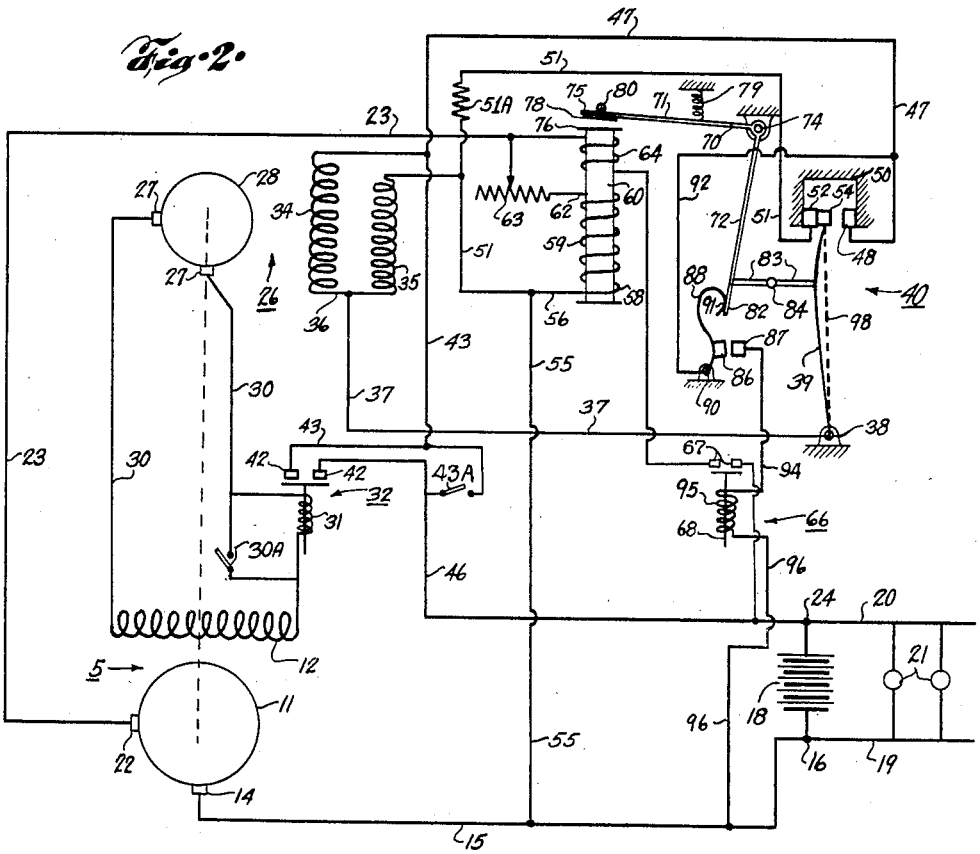
INVENTOR.
GORDON R. ANDERSON
BY
Roy M. Tiley
ATTORNEY.

Patented June 27, 1939

2,163,972

UNITED STATES PATENT OFFICE 2,163,972

CONTROL SYSTEM FOR DYNAMO-ELECTRIC MACHINES

Gordon R. Anderson, Beloit, Wis., assignor to Fairbanks, Morse & Co., Chicago, Ill., a corporation of Illinois Application March 2, 1936, Serial No. 66,588

3 Claims. (Cl. 171—313)

This invention relates to control systems for dynamo-electric machines, and more particularly to an improved voltage regulating system and method of voltage regulation for electrical generating apparatus having particular application to railway cars and the like.

The system contemplated by the present invention provides for a positive and uniform regulation of the voltage output of one or more generators supplying power to a railway car or the like, wherein the generator is arranged to be driven by the car, as by a driving connection from a car axle to the generator rotor. The regulating system is adapted for maintaining the generator voltage substantially constant at a predetermined value, over a wide range of generator rotor speeds, the generator speed usually being determined by the speed of the railway car.

Accordingly, an object of the invention is to provide a system of voltage regulation for generators including a main, axle-driven generator, an exciter generator therefor, and voltage regulating mechanism including a regulator of vibrating-contact type.

Another object is to provide, in combination with a main generator of separately excited type, an auxiliary generator or exciter for supplying excitation current to the field of the main generator, the exciter generator having at least two field windings differentially wound so as to oppose each other, and magnetically actuated apparatus of vibrating contact type operable responsively to variations in the voltage of the main generator, for regulating the excitation of the exciter generator field windings, in a manner to affect the output of the exciter, and hence the excitation of the main generator, whereby to adjust the voltage of the main generator and to maintain it substantially constant under all operating conditions.

A further object is to provide in a system of the type described, voltage control apparatus of the vibrating-contact type acting directly upon magnetic field windings, or upon a magnetic field winding and a resistor element in series with the field winding.

A still further object is attained in an improved combination of a main generator, an exciter generator therefor, and voltage control mechanism, wherein the polarity of the main generator is maintained unidirectional irrespective of reversals in the direction of rotation of the main generator rotor, without the use of brush shifting mechanism and the like, Further objects and advantages will appear from the following description, and from the drawing, in which:

Fig. 1 illustrates a generator mounted beneath the frame of a railway car and arranged to be driven from an axle of the car; Fig. 2 is a diagrammatic view of a preferred circuit arrangement of the control system embodying the improved features of the invention, and Fig. 3 is a fragmentary diagrammatic showing of a modified exciter field arrangement.

Referring first to Fig. 1 by suitable reference characters, 5 designates a generator suitably mounted beneath the frame 6 of a railway car 7, and arranged to be driven from an axle 8 of the car by any suitable driving means, such as the belt 9.

Fig. 2 illustrates diagrammatically the preferred circuit arrangement for the generator voltage control method and means now to be described. The generator 5, which in the present example is a direct current machine, is comprised of an armature 11 and a field winding 12. A terminal 14 of the generator armature is connected by a conductor 15 with one terminal 16 of a storage battery 18 and with one side 19 of the power distribution mains 19—20 supplying the load 21, while the terminal 22 of the generator is connected by a conductor 23 with the main 20 and the terminal 24 of the battery 18.

Field winding 12 of generator 5 is supplied with excitation current by an auxiliary or exciter generator generally designed by the numeral 26. In the present example, the exciter generator may be secured to the frame 6 of the car 7, or to the frame of the main generator 5, so that its armature may be coupled to the armature of the main generator to be driven thereby, and by the axle of the car.

The field 12 is connected to the terminals 27 of the exciter armature 28 as by conductors 30. In series with one of the conductors 30 is shown an operating coil 31 of a conventional circuit control relay 32. The exciter generator is by preference, of a separately excited type, provided, as shown by Fig. 2, with two field windings 34 and 35, the winding 34 serving as the main field of the exciter and winding 35 as a control field, the latter winding being wound so as, when excited, to tend to oppose the function of field 34. Also, the main winding 34 may be comprised of a greater number of coil turns relative to the turns of coil 35, so that the flux producing capacity of coil 34 will predominate over that of coil 35. The windings are connected in series by a conductor 36, with the conductor 36 connected by a lead 37 to the vibrator contact arm 39 of a voltage control relay generally denoted by the numeral 40. As shown, the lead 37 is connected to the vibrator arm 39 through the pivotal support 38 for the arm. Winding 34 is connected at or near its free end to one of the contacts 42 of the control relay 32, as by a conductor 43, while the opposite contact of the relay is connected by a conductor 46 with the line conductor 20 and terminal 24 of the battery. Conductor 43 is also in circuit with the voltage control relay 40 through a branch conductor 47 connected to a fixed contact 48 mounted upon an insulating frame portion 50 of the relay. Control winding 35 is associated with the relay 40 through a conductor 51 connecting the free end of the winding with a second fixed contact 52 which also may be secured to the insulating frame portion 50. The fixed contacts 48 and 52 are arranged in spaced, opposed relation so as to be selectively engaged by a contact 54 carried by the vibrator arm 39 of the relay. Depending upon the space relation of contacts 48 and 52, it may be desirable to include in the lead 51, a resistor 51A, to obviate any tendency to arcing between the relay contacts. Conductor 51 is also connected by branch conductors 55 and 56, respectively, with the main generator line conductor 15 and one end 58 of a magnet winding 59 disposed on the armature core 60 of the relay 40. The opposite end 62 of winding 59 is connected to the main generator lead 23 through an adjustable resistor element 63. It will be evident from the described circuit arrangement of the magnet coil 59, that the coil is connected across the main generator mains 15 and 23, hence the excitation of this coil will be subject to the potential difference or voltage existing between these mains. Moreover, since the adjustable resistor element 63 is in series with coil 59, the voltage drop across the coil and that across the resistor, may be apportioned so as to regulate the degree of excitation of coil 59 for purposes of generator voltage control as will later appear.

It has been found by experience that the relay unit 32, including the coil 31, contacts 42 and associated structure, may be omitted to advantage in certain installations, as when the system is utilized on railway cars adapted for high speed operation. In such cases the conductors 43 and 46 will be directly connected through a switch 43A (Fig. 2) and one of the conductors 30 will, in this event, be completed between the exciter and the field 12 through the switch 30A (Fig. 2). With the circuit arranged in this manner it will appear that the battery is connected at all times through terminal 24 and through the jumper 43A, with the exciter field windings, thus assuring a unidirectional polarity of each winding at all times and irrespective of reversals in generator rotation.

In series with the generator conductor 23 is a current coil 64 disposed on the magnet core 60, and so related to the magnet coil 59 as normally to assist the function thereof when current supplied by the main generator is traversing the current coil. Also in series with the generator conductor 23 is a generator safety cutout device 66. The conductor 23 is divided and the free ends thereof connected to spaced contacts 67. The contacts are adapted to be bridged or closed by the armature element 68 of the cutout device 66 which, in the present embodiment, is by preference, a voltage operated relay. It is to be understood, of course, that the cutout may be and in function is similar to any of the well known reverse current relays usually employed for preventing a reversed flow of current from the battery to the generator.

The vibrator arm 39 of the relay 40 is arranged to be operated by a bell crank member 70. The member 70 is comprised of arms 71 and 72 and is pivoted at the juncture 74 of the arms, to a portion of the relay frame. The end portion 75 of arm 71 is disposed adjacent the end 76 of the relay core 60 and carries an armature element 78, whereby the bell crank may be pivotally actuated in response to the magnetic excitation of the core 60. A tension spring 79 serves to urge the arm 71 and its armature element 78 away from the magnet end 76 and against a stop element 80.

The crank arm 72 is operatively connected near its free end 82 with the vibrator arm 39 of the relay, as by the link elements 83 preferably rigidly connected to the arms 72 and 39 respectively, and pivotally connected by a free or floating pivot connection 84. The arm 39 is insulated from the arm 72 through the connecting links 83, as by forming these links of a suitable insulating material, or by insulating the pivot connection 84.

The end 82 of arm 72 is adapted, also, to control the connection and disconnection of a movable contact element 86 with a stationary contact 87. The contact 86 is carried by an arm 88, preferably of resilient metal, pivoted at 90 and extended on its free end 91 into the path of movement of the end portion 82 of arm 72. Contact 86 is in circuit with the relay contact 48, more specifically with the associated circuit conductor 47, through a conductor 92, while the fixed contact 87 is connected, by a conductor 94, with one end of the operating coil 95 of the cutout relay 66. The other end of coil 95 is connected with the generator main 15 as by a conductor 96. As before noted, the cutout relay 66 is preferably of voltage operated type, and in this connection, it is desired to point out that the armature 68 may be retracted to circuit-open position with respect to the contacts 67, by a suitable spring or other means (not shown), while the armature 68 is actuated to bridge contacts 67 responsively to energization of relay coil 95.

It will be noted from an inspection of Fig. 2, that the vibrator arm 39 of relay 40 is stressed so as to be displaced to the left of its unstressed position indicated by the dotted line 98, when the bell crank is positioned by the spring 79 so that the arm 71 engages the stop 80. Also in this position of the bell crank, the contacts 86 and 87 will be disengaged, as shown. In the described position of the bell crank, the stressed displacement of the arm 39 as effected by the crank, is such that upon initial excitation of the magnet core 60, the bell crank may be operated sufficiently to permit the vibrator arm 39 to return to its unstressed position 98, thereby effecting a closure of contacts 86 and 87, but without causing disengagement of the vibrator contact 54 from the stationary contact 52.

In the operation of the system described, while the railway car is at a standstill, the circuit disposition of the elements of the system will be that illustrated by Fig. 2, wherein the relay 32 (when utilized) relay 66 and the contacts 86—87 are open-circuited, and the contact 54 on vibrator arm 39 of relay 40 engages the fixed contact 52. In this instance, the battery 18 may supply current to the mains 19—20.

excitation of the exciter is not only reduced, but at alternate intervals a completely reversed or negative excitation of the exciter obtains. Hence a more rapid and positive control of the main generator voltage is attained, whereby to maintain the generator voltage substantially constant during high speed operation of the car 7. At intermediate speeds of the car 7, the relay 40 may operate the arm 39 to a neutral position such that the contact 54 is open-circuited with respect to both fixed contacts 48 and 52. In this case, both exciter fields 34 and 35 will be energized to control the excitation of the exciter and hence of the main generator, whereby to regulate the voltage of generator 5.

It will be noted that the current coil 64 of relay 40 is wound in a manner normally to assist or augment the excitation of the magnet 60 by the voltage coil 59, this condition obtaining when the generator is supplying the load, battery or both. Thus such an excitation of magnet 60 is attained, that the relay 40 may operate to regulate the voltage of generator 5 not only responsively to variations in the speed of car travel, but also in a manner tending to compensate for variations in the loading of the generator, as by load changes on the mains 19—20.

If during the normal operation of the system above described, the voltage of generator 5 drops below that of the battery 18, the excitation of coil 64 of the relay 40 will be reversed in polarity so as to effect, in the manner heretofore described, a deenergization of cutout coil 95 and hence a retraction of the armature 68 from its closure of contacts 67. Thus the generator line lead 23 will be open-circuited whereby to cut off the generator circuits from the battery 18 and line 19—20. However, upon reversal of current flow through the coil 64, the opening of contacts 86 and 87 to effect a disconnection of the generator from the mains 19—20, will not occur until the opposing force of the coil 64 overcomes the attractive force of coil 59, both acting on the arm 71. Accordingly, before the generator becomes disconnected, the differential effect of the winding 64, due to current reversal therethrough, will operate in a manner heretofore described, to exclude the winding 35 from the exciter field circuit. The consequent retention of only winding 34 in the exciter field, will tend to augment the exciter voltage and hence the generator voltage to an extent tending to overcome the conditions resulting in current reversal in the lead 23 and winding 64.

It will be evident from the arrangement and circuit relation of the main and exciter generators 5 and 26, that a reversal in the direction of rotation of the armatures thereof, will not cause a reversal of polarity of the main generator 5. In reversing armature rotation, the polarity of the exciter field 34, which is excited by current from the battery 18, remains unchanged, and when the exciter armature 28 reverses, the direction of exciter current traversing the leads 30 also reverses, hence effecting a reversed excitation of the field winding 12. Since both the field and armature of the main generator 5 are reversed at the same time, the polarity of the generator remains unchanged. Thus the present system eliminates any need for brush shifting or other polarity-maintaining apparatus, as a special exciter field construction to attain a high magnetic remanence characteristic thereof in order to provide for a high residual magnetism in the exciter field, whereby to maintain the generator polarity unidirectional irrespective of reversals in generator rotation.

The relay 32 when utilized, effects an open circuit between the battery and exciter field coil 34 when there is no current traversing the leads 30, as when the railway car is at a standstill, thereby preventing any drain on the battery which might otherwise occur due to continuous energization of the exciter field. Closure of relay 32 occurs whenever the armature 28 of exciter 26 begins to rotate, the natural residual magnetism of exciter field 34 being sufficient to cause a current to traverse the leads 30 which is sufficient to excite the relay coil 31.

Referring now particularly to the alternate but equally preferable arrangement shown by Fig. 3, it will appear that the arrangement therein disclosed is a counterpart of the exciter field shown by Fig. 2, except for the distinction that the differential winding 35 is, according to Fig. 3, replaced by a resistor winding 35A. The leads such as 36, 37, 47, 51 and the other circuit relations of the parts remain as described in connection with the complete circuit diagram of Fig. 2, and hence are not duplicated in connection with Fig. 3.

The operation and function of the resistor 35A is primarily to provide, in response to the higher generator speeds and voltages, a flux-suppressing effect incident to the introduction of a resistance in series with the exciter field winding 34. It will be understood that most of the foregoing description relating to the action of the relay 40 in either periodically or intermittently introducing the differential winding 35 into and excluding it from the exciter field circuit, is equally applicable when read in connection with the circuit relation of the resistor 35A.

Although for convenience of illustration, Fig. 3 shows only that portion of the circuit immediately related to the winding and resistor assembly associated with the exciter field, it will be understood that combinations of the several items of apparatus shown by Figs. 2 and 3 may be selectively utilized in either modification, as will be apparent from the drawing when considered in the light of the foregoing description.

The presently improved generator voltage control system fully attains the foregoing objects, and in addition the system is well adapted for compactness of assembly. Since the system is fully automatic in its control and regulation of the generator voltage, the several relays and elements of the control circuit may be compactly arranged in a dust proof container (not shown), and the container mounted upon the frame of either the generator 5 or the exciter 26, or upon a portion of the car underframe 6 adjacent the generator assembly. Thus there need be few if any control elements within the body of the car, thereby saving space, additional wiring and control instruments.

It is to be understood that the present description and drawing relate only to a preferred embodiment of the invention, and that substantial alterations and modifications may be effected in the system without departing from the spirit and full intended scope of the invention, as defined by the following claims.

I claim:

1. In a system of voltage regulation, a main generator having a field coil, an exciter generator for supplying excitation current to said field coil, a field circuit for said exciter, including a pair of windings and a source of direct current in circuit therewith throughout operation of the system, During acceleration of the car 7, the control relay 32 closes as a result of the excitation of the relay coil 31, thereby placing the battery 18 in circuit with the exciter fields 34 and 35, or from battery terminal 24 through conductor 46, relay contacts 42, conductor 43, field 34, conductor 36, field 35, conductors 51, 55 and 15 to the opposite terminal 16 of the battery. It is to be noted here that when relay 32 is not utilized, the battery 18 will be in circuit with the exciter fields at all times, as through the connection 43A. Thus the fields 34 and 35 are supplied with excitation current from the battery. As the exciter armature 28 accelerates with the armature 11 of the main generator 5, the exciter will supply excitation current to the field winding 12 of generator 5. With the excitation of field 12, the voltage existing across the generator leads 15—23 will steadily rise with increasing speed of car movement, and hence rotative speed of the generator armature 11. Since the voltage control relay coil 59 is at all times in parallel circuit relation with the armature 11 of generator 5, through generator leads 15—23, conductors 55 and 56 and resistor 63, it will be readily understood that once the regulating resistor 63 is set at a predetermined resistance value, the degree of excitation of the relay coil 59 will be directly proportional to the generator voltage or potential difference existing between the generator leads 15—23. Excitation of the relay 40 in this case, is entirely independent of the voltage of battery 18. Thus as the generator voltage rises, the excitation of coil 59 increases proportionately, thereby magnetizing the core 60 for operating the bell crank mechanism 70 of the voltage control relay.

During acceleration of the generator armatures 11 and 28, the exciter field 34 is fully excited by the battery 18, while the reversed field 35 remains short-circuited by reason of the closure of contact 54 with the fixed contact 52. The short-circuit of winding 35 in this instance is effected through the circuit elements 36, 37, 39, 54, 52 and 51. When the voltage of the generator 5 approaches that of the battery 18, the bell crank 70 will be actuated, through the increased excitation of relay coil 59, to relieve the stressed vibrator arm 39 so that it will return to the dotted line position 98. In this instance the crank arm 72 in releasing the stressed arm 39, will also effect a circuit engagement of contacts 86 and 87. Closure of these contacts completes an excitation circuit for the actuating coil 95 of relay 66, the circuit including the elements 94, 87, 86, 88, 92, 47, 43, 46 to the load main 20, and 96 to the opposite main 19. Whenever the battery voltage predominates over that of the generator 5, the polarity of excitation of the relay coil 64 will be reversed by reason of the reversed flow of current, so that its action on the armature 78 and arm 71 will be opposite to that of voltage coil 59. When the magnetic strength of coil 64 exceeds that of coil 59, spring 79 may then act to retract arm 71 and its armature 78 from the core end 76. The resulting movement of arm 72 effects through actuation of element 88, a disengagement of contacts 86 and 87, which thereby open-circuits the cutout relay energizing coil 95 to effect an open-circuit of the generator lead 23, through contacts 67. On the other hand, whenever the generator voltage appreciably exceeds that of the battery, the polarity of coil 64 becomes such that the magnetic force of this coil, when energized, aids that of coil 59, to attract the arm 71 and its armature 78. When the arms 71 and 72 have been pivotally actuated a predetermined amount, under the initial influence of coil 59, a closure of contacts 86 and 87 will result. As heretofore described, closure of these contacts completes the energizing circuit for coil 95 of cutout relay 66, which when energized, effects a closure of line contacts 67. Thus the generator lead 23 is connected to the load main 20, whereby the generator 5 may supply load current to the load 21 and charging current to the battery 18. It is to be noted here that the tension of spring 79 is regulated so that an initial pivotal movement of the arms 71 and 72 sufficient to effect a closure of contacts 86—87, as effected through the attraction of arm 71 under the influence of coil 59, is attained only when the voltage of coil 59 and its regulating resistor 63 is greater than the normal battery voltage. Also, it will be readily understood from the foregoing, that the relay 66 serves as the circuit contactor portion of a reverse current relay mechanism which includes, in combination, the current coil 64, pivoted arms 71—72, spring support 88, contacts 86—87 and the relay 66.

The function of the voltage control relay 40 is such that at low operating speeds of the generator armature 11, should the voltage of generator 5 tend to rise above a predetermined desired value, the increased excitation of the coil 59 and relay magnet 60 will cause the bell crank 70 to actuate the pivoted arm 39 so as to break the circuit theretofore completed between the contacts 54—52. Thus the short-circuit about the reversed field coil 35 of the exciter will be opened, permitting this winding to be excited in opposition to the excitation of the winding 34. In this instance, the two field coils 34 and 35 are connected in series and both across the generator leads 15—23, the circuit being effected through the circuit elements 15, 55, 51, 35, 36, 34, 43, 42 46 and 23. Since the two field windings are in opposition the resultant field excitation for the exciter will be reduced, hence reducing the output of the exciter to the field 12 of the main generator. Thus as a result of the reduced field excitation for the generator 5, the generator voltage will be decreased, and hence the excitation of magnet 60 by coil 59 will be reduced, thus effecting a decrease in magnetic pull on the bell crank so that the spring 79 may operate on the crank to effect a re-engagement of the contact 54 with the contact 52. Closure of contacts 54—52 again short-circuits the coil 35 with the consequent tendency for the exciter voltage to rise and thus increase the voltage of the generator 5 through increased excitation of the main field 12.

The above described operation of the relay 40 is practically instantaneous, so that in the regulation of the main generator voltage, the arm 39 carrying the contact 54 will be caused to vibrate rapidly, alternately introducing and cutting out of circuit the reversed field coil 35 of the exciter generator 26. As before noted, rapid make and break of the contacts 54—52 occurs only at low operating speeds of the car 7 and hence of the generators 5 and 26. Thus the relay 40 operates to maintain the voltage of generator 5 fairly constant, irrespective of change in car speed over a certain predetermined range of operating speeds of the generator.

During relatively high speed operation of the railway car 7, the increased excitation of the coil 59 of relay 40 effects operation of the bell crank 70 and the relay arm 39 to cause a rapid make and break between the contacts 54 and 48, which alternately short-circuits the field coil 34, while the reversed field winding remains excited. Thus the for supplying excitation current to the windings, said windings also being in circuit with said main generator, mechanism of electromagnetically operated type, adapted for controlling the function of said windings, said mechanism being operatively responsive to both current and voltage conditions of said main generator, a load circuit for said generator, a contactor of electromagnetic type, adapted for connecting said generator to the load circuit, an energizing circuit for said contactor, and means associated with said energizing circuit and operated by said mechanism, for controlling the energization of said contactor.

2. In a system of voltage regulation for a main vehicle-operated generator, a field coil therefor, an exciter generator driven from said main generator and provided for supplying excitation current to said field coil, a field circuit for said exciter generator, including at least two windings in circuit with said main generator, a source of direct current in circuit with said windings throughout operation of the system, for supplying excitation current thereto, whereby the polarity of said windings is maintained unidirectional irrespective of reversals in generator rotation responsive to reversals of vehicle movement, the unidirectional polarity of said windings serving to maintain the polarity of said main generator unidirectional throughout its operation, a bridging circuit associated with each of said windings, a bridging circuit control means common to said bridging circuits and in circuit with said main generator, adapted for effecting a periodic short-circuit of one of said windings in response to an operative condition of the main generator and for effecting a periodic short-circuit of the other of said windings in response to a different operative condition of the main generator, a load circuit for said main generator, and an electromagnetic contactor operable to connect the main generator to said load circuit, operation of said contactor being controlled by said bridging circuit control means.

3. In a system of voltage regulation, in combination with a main generator, a field winding therefor, means for supplying a regulated excitation current to said field winding, said means comprising an auxiliary generator of separately excited type, having a field coil and a field resistor in circuit with said main generator, a source of direct current in circuit with said field coil and resistor throughout operation of said system, provided for supplying excitation current thereto, a bridging circuit for said field coil and resistor, control means in said bridging circuit responsive to operative conditions of said main generator, and an adjustable resistance for said control means, said control means being adapted for regulating said bridging circuit to effect, selectively, an intermittent short-circuiting of the resistor or field coil.

GORDON R. ANDERSON.